May 17, 1960     A. F. THOMPSON     2,937,223

VENT PLUG

Filed May 5, 1958

Inventor
Allen F. Thompson
By John L. Hutchinson
Attorney

United States Patent Office 2,937,223
Patented May 17, 1960

2,937,223
VENT PLUG

Allen F. Thompson, Glen Ellyn, Ill., assignor to The Richardson Company, Melrose Park, Ill., a corporation of Ohio Application May 5, 1958, Serial No. 733,096

8 Claims. (Cl. 136—177)

This invention relates to vent plugs adapted to be used with battery cell covers and, in particular, to a vent plug having additional means for preventing discharge of acid from a battery cell.

Automotive storage batteries are normally provided with a plurality of cells containing plates, separators and the required amount of electrolyte. In the normal automotive storage battery, the electrolyte is sulfuric acid which, while serving to provide the necessary electromotive force in conjunction with the active ingredients of the plates, is nevertheless a rather corrosive fluid. Accordingly, special precautions must be taken to prevent acid from being accidentally discharged from the battery cells onto surrounding metal parts.

As a result of the chemical reactions occurring in a storage battery, gases are evolved and an outlet must be provided to permit egress of these gases from the battery cell. The usual method in which this is accomplished is to provide vent openings in the plug used to close the electroylte filling well extending downwardly through the cell cover into each cell. The plug or cap, herein referred to as the "vent plug," is generally hollow and contains one or more small vertically offset openings in both the bottom and top thereof. In the ordinary storage battery, these small openings will readily permit the egress of gases while simultaneously offering obstruction to the acidic electrolyte which may be jostled upwardly and, hence, prevent the electrolyte from being discharged from the cell.

Certain vehicles, such as tractors, are often driven over exceedingly rough terrain whereby the batteries of such vehicles are given a constant jarring to the extent that the electrolyte from the cell quite frequently is discharged through the vent plug openings even though such openings are relatively small. Accordingly, special provisions must be made to decrease, if not substantially eliminate, this possibility.

The principal object of this invention is to provide a vent plug having a baffle disposed within the plug and between the lower and upper openings, whereby an additional obstruction is provided for electrolyte which may enter the plug while at the same time permitting the free egress of gases from the cell to the atmosphere.

In the drawings, Figure 1 is a sectional view of a vent plug and baffle assembly as contemplated by the present invention.

Figure 1:
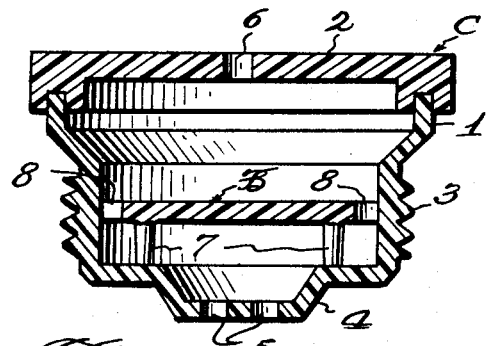

Referring now to the drawing and, more particularly, to Figure 1 thereof, the letter "C" indicates, generally, a vent plug of the type normally used to close the filling well of a battery cell cover, not shown. The plug comprises a hollow base 1 and a top 2, the latter being provided with a circular recess in its underside to receive the upper circular edge of the base. The base 1 and top 2 are permanently united together by applying, for example, an adhesive in the aforementioned recess prior to assembly of the base and top. The base 1 and top 2 of the vent plug may be formed from a variety of plastic materials by means of a molding operation. Typical materials from which such elements may be made are polystyrene, polyethylene and rubber.

The base 1 is customarily provided with threads 3 for engagement with complementary threads located within the top of the filling well of the cell cover. The bottom of the particular base 1 illustrated is provided with a slight downwardly extending centrally disposed projection 4 having two vent openings 5 extending therethrough. The top 2 is likewise provided with a vent opening 6. The vent openings 5 and 6 are relatively small and, preferably, vertically offset. With the usual jarring of an automotive vehicle, electrolyte, which might be thrown upward from the cell, will be offered a rather tortuous path between the vents 5 and 6 to the extent that little, if any, of the electrolyte will be discharged out of the opening 6. Some of the electrolyte may enter the vent cap by reason of the opening 5, but such electrolyte will usually flow back into the cell. Such a tortuous path presented to the electrolyte would not, however, effect the free discharge of gases which are evolved, as the same may readily pass into the hollow vent plug through opening 5 and then out of the opening 6.

As previously indicated, batteries in certain vehicles, such as farm tractors, are subjected to an unusual amount of jarring, whereby more opportunity is given to the electrolyte within the cell to be forced out of the vent plug even though the aforementioned vent openings are relatively small. Such discharge of electrolyte results in extensive corrosion around the battery area and, particularly, corrosion of metallic supports or other elements which may be in the vicinity of the battery.

Accordingly, a baffle has been developed which may be inserted within the vent plug during its assembly to provide an additional obstruction to the discharge of electrolyte. This baffle is designated by the letter "B" in Figure 1. The baffle is constructed so that it may be disposed transversely within the vent plug and in a position which is intermediate of the openings 5 and 6. In order to permit egress of gases from the cell, it is necessary that the baffle be provided with suitable openings. One means of providing such openings would be to have the baffle not extend completely to the internal walls of the base 1 or be formed with recesses 8 around its periphery. Openings other than those formed by recesses 8 may be made at various points in the baffle body B but, preferably, such openings should be vertically offset with respect to either vent openings 5 or 6, thereby substantially assuring that electrolyte, which may find its way into the hollow vent plug, will be offered a substantial obstruction.

As is indicated in Figure 1, the baffle B is supported in its intermediate position within the vent plug by means of a plurality of legs or projections 7 extending downwardly therefrom. In order to hold the baffle in its desired position, the lower faces of the projections 7 should be adhesively secured to opposing surfaces of the bottom of the vent plug. This can readily be accomplished by applying an adhesive to the lower surfaces of the projections 7 prior to insertion of the baffle within the hollow base 1. In assembling the vent plug, the baffle is initially placed within the hollow base 1 and then the cap 2 secured thereto as previously indicated.

Baffle B may be formed by a suitable molding operation from any plastic composition of, for example, the same type as that from which the vent plug parts are molded. In a molding operation, the projections 7 may be formed simultaneously with the formation of the baffle and as an integral part thereof.

Figure 2:
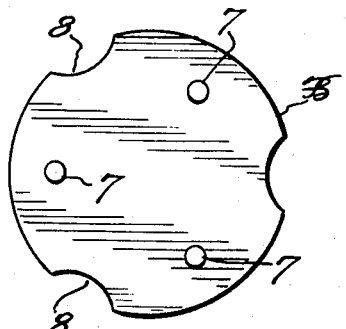
Figure 2 is an inverted plan view of the baffle forming a part of the assembly of Figure 1.

Figure 2 illustrates a view of the baffle of Figure 1 showing recesses 8 in the periphery thereof which, together with the corresponding opposing internal surfaces of the base 1, form the desired openings through the baffle for egress of gases.

Figure 3:
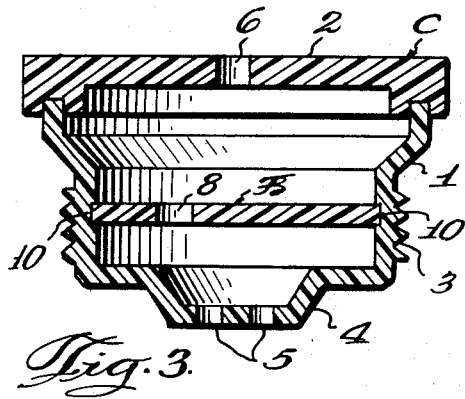
Figure 3 is a sectional view of a modified vent plug and baffle assembly.

In Figure 3, there is shown a modification of the vent plug wherein the baffle is retained in its intermediate position between the vent openings by means of recesses 10 provided in the internal walls of the base. The outer edges of the baffle B may be engaged within the recesses by means of a snap fit and thereby held in the desired position.

Figure 4:
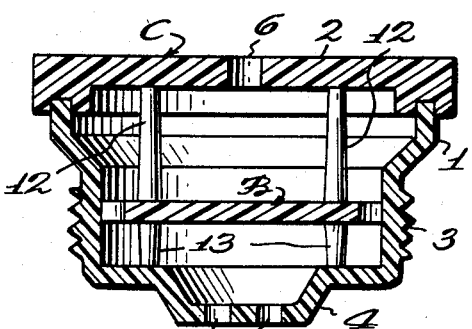
Figure 4 is a sectional view of another modification.

A further modification is illustrated in Figure 4 wherein the baffle is formed with projections 12 and 13 extending upwardly and down from its upper and lower surfaces respectively. Projections 12 and 13 are of such dimensions that the baffle will be retained in the desired position within the hollow base 1 when the top 2 is united with the base. In such a modification, it is not necessary to adhesively join any of the outer faces of the projections 12 or 13 with the corresponding opposing surfaces of either the base or the top, but rather the baffle will be mechanically locked or held in a position between the base and the top.

Figure 5:
Figure 5 is a partial sectional view of a modification of the baffle.

The projections 12 and 13 may be a plurality of small integral rod-like elements extending from the respective surfaces of the baffle or may, as is indicated in Figure 5, be formed as ribs, such as ribs 14 and 16 extending substantially across the upper and lower surfaces of the baffle. In a structure such as is illustrated in Figure 5, it may be necessary to provide openings 15 through the ribs to permit egress of gases from the cell through the vent plug. Such an opening may comprise a break in the surface of the ribs. However, if the ribs do not extend completely across the surface of the baffle, openings will thereby be provided around their ends for passage of gases.

Figure 6:
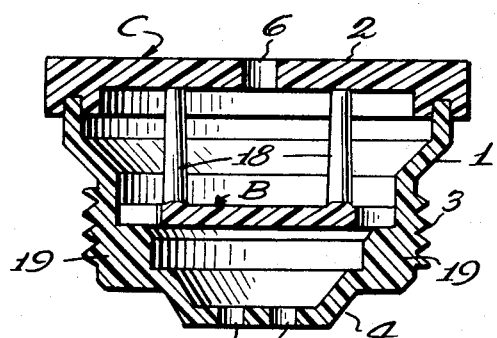
Figure 6 is a further sectional view of another modification.

A still further modification is illustrated in Figure 6 which discloses the baffle B containing two upwardly extending projections 18 whose outer surfaces bear against the under surface of the top 2. The lower surface of the baffle B rests on two or more supporting elements or shoulders 19 which would be formed integrally with the base 1. In such an arrangement, it can be seen that the baffle B would be held in its desided position by the construction shown and it would not be necessary to apply adhesive to hold the baffle. However, if the projections 18 were not desired, the baffle B could be retained in position by means of an adhesive applied to the areas of contact of the baffle with shoulders 19.

By means of the structure described above, electrolyte is substantially, if not completely, prevented from being discharged through a battery cell cover vent plug even in those cases when excessive jarring of the battery occurs. The present invention has been described as particularly applicable to vent plugs of battery cell covers; however, it will be appreciated that similar structures may be used in connection with any hollow stopper adapted to be used with other types of containers wherein similar problems arise.

Having described certain exemplary embodiments of the invention, the same is intended to be limited only by the scope of the following claims.

I claim:

1. A vent plug for a battery cell cover filling well comprising a hollow base section closed at one end and provided with a top permanently united thereto forming an enclosed chamber, vent openings in said top and the bottom of said base section; and a transverse baffle permanently disposed within said base section intermediate of said top and the bottom of said base section and extending between the sides of said base section thereby dividing said chamber into independent upper and lower compartments, said baffle being provided with at least one relatively small opening therethrough connecting said compartments, whereby cell fluids are substantially obstructed from passage between said vent openings while simultaneously permitting relatively free egress of gases from said cell.

2. A vent plug as described in claim 1 wherein said baffle is supported in position by means of integral projections extending from at least one surface of said baffle.

3. A vent plug as described in claim 2 wherein the outer face of said projections are permanently united to an opposing internal surface of said vent plug.

4. A vent plug as described in claim 1 wherein said baffle is supported in position by means of recesses disposed within the inner surface of said vent plug which are adapted to receive outer edges of said baffle.

5. A vent plug as described in claim 1 wherein said baffle openings are established by recesses in the periphery of the baffle.

6. A vent plug as described in claim 1 wherein said baffle is supported in position by means of shoulders extending inwardly from the internal surfaces of said vent plug.

7. A vent plug as described in claim 1 wherein said baffle is provided with a plurality of ribs projecting outwardly from the surfaces thereof and extending substantially across said surface.

8. A vent plug as described in claim 1 wherein the baffle openings are vertically offset with respect to the vent openings in said top and the bottom of said base section.

References Cited in the file of this patent

UNITED STATES PATENTS

| | | |
|---|---|---|
| 1,166,102 | Willard | Dec. 28, 1915 |
| 1,426,966 | Dean | Aug. 22, 1922 |
| 1,907,911 | Wallace et al. | May 9, 1933 |
| 2,658,100 | Kendall | Nov. 3, 1953 |

FOREIGN PATENTS

| | | |
|---|---|---|
| 546,943 | Great Britain | Aug. 6, 1942 |
| 166,186 | Great Britain | July 11, 1921 |
| 464,282 | Great Britain | Apr. 12, 1937 |
| 551,888 | Great Britain | Mar. 15, 1943 |